(12) United States Patent
Ward et al.

(10) Patent No.: US 9,614,988 B2
(45) Date of Patent: Apr. 4, 2017

(54) FORMATTER CAGE

(71) Applicant: HEWLETT-PACKARD DEVELOPMENT COMPANY, L.P., Houston, TX (US)

(72) Inventors: Jeff D. Ward, Meridian, ID (US); Eric Young, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/787,526

(22) PCT Filed: Aug. 16, 2013

(86) PCT No.: PCT/US2013/055388
§ 371 (c)(1),
(2) Date: Oct. 28, 2015

(87) PCT Pub. No.: WO2015/023298
PCT Pub. Date: Feb. 19, 2015

(65) Prior Publication Data
US 2016/0112591 A1    Apr. 21, 2016

(51) Int. Cl.
*H04N 1/00* (2006.01)
*H04N 1/04* (2006.01)

(52) U.S. Cl.
CPC ..... *H04N 1/00538* (2013.01); *H04N 1/00522* (2013.01); *H04N 1/00559* (2013.01); *H04N 1/04* (2013.01); *H04N 2201/0094* (2013.01)

(58) Field of Classification Search
USPC ........................................................ 358/1.13
See application file for complete search history.

(56) References Cited

U.S. PATENT DOCUMENTS

| 5,825,401 | A * | 10/1998 | Wadley | B41J 2/442 |
| | | | | 347/247 |
| 6,285,548 | B1 | 9/2001 | Hamlet et al. | |
| 6,769,045 | B2 | 7/2004 | Tanaka et al. | |
| 7,298,615 | B2 | 11/2007 | Wong | |
| 7,944,576 | B2 | 5/2011 | Zimmerman et al. | |
| 2002/0178314 | A1 | 11/2002 | Cho | |
| 2006/0223486 | A1 | 10/2006 | Ruff et al. | |
| 2008/0183933 | A1 | 7/2008 | Peng et al. | |
| 2013/0058695 | A1 | 3/2013 | Jensen et al. | |

FOREIGN PATENT DOCUMENTS

| GB | 2445977 A | 7/2008 |
| JP | 2013058979 | 3/2013 |
| KR | 20120094424 | 8/2012 |
| KR | 20120112038 | 10/2012 |

OTHER PUBLICATIONS

Tech Parts Warehouse, HP Format Board Network, 2012, Tech Parts Warehouse, TechPartsWarehouse.com, all pages.*

(Continued)

*Primary Examiner* — Ngon Nguyen
(74) *Attorney, Agent, or Firm* — HP Inc., Patent Department (57) ABSTRACT

A formatter cage is disclosed. The formatter cage includes a three point mounting system for expansion modules.

15 Claims, 7 Drawing Sheets

(56) References Cited

OTHER PUBLICATIONS

Hewlett-Packard, HP Laser Pro 100 Color MFP, 2009, Hewlett-Packard Development Companny, 2009 Service Manual Rev. 05/09, pp. 40-41.*
Printer Works, Formatter Assembly, 2007, The Printer Works Inc., http://www.printerworks.com/Catalogs/HP-LaserJet-P4015/152_LJP4015.html, all pages.*
Hewlett-Packard, HP LaserJetP4010 and P4510 Series Printers, 2008, Hewlett-Packarf Development Company, 2008 Service Manual, pp. 150-151.*
Combined Service Manual, (Web Page). http://home.comcast.net/~wannabeyote/hp-lj-4-5-m-n-plus.pdf.
HP Color Laserjet 8550 Series Printers—Hard Disk Related Control Panel Messages, Explanation of Job Retention Features, and How to Remove and Install the Optional Hard Disk, (Web Page).
HP Designjet 500, 510, and 800 Series Printers—SODIMM Memory Installation, (Web Page). http://bizsupport1.austin.hp.com/bizsupport/TechSupport/Document.jsp?lang=en&cc=us&taskId=125&prodSeriesId=297079&prodTypeid=18972&objectID=c00059568&printver=iru.
International Searching Authority, The International Search Report and the Written Opinion, May 13, 2014, 11 Pages.

* cited by examiner

FORMATTER CAGE

BACKGROUND

Some printers or multi-function devices can be customized by installing expansion modules into the device. The expansion modules may be able to add a number of different features to the printer, for example a hard disk drive, a different type of input/output (I/O) port, a different internet connection protocol, additional USB ports, a USB hub, a security module and the like. Most of these expansion modules are attached to the formatter board of the printer.

DETAILED DESCRIPTION

Printers are sold at different price points. The lowest price point printer has a base set of features. Each increase in the price point has a corresponding increase in the feature set for a printer. Some users want to increase the feature set of their printers beyond the feature set of a given price point, but do need all the features included in the next higher price point. Other users may want a single feature that is only available in the highest price point printer. Yet other users may want to add features to their printers that are not currently available in any of the printers currently for sale.

In one example, a printer will support expansion modules that can be installed into the printer. In some examples the printer is a standalone printer. In other examples the printer may be a component of a multi-functional device (MFD). MFD are also known as multi-functional peripherals (MFP) or All-in-One (AiO) devices. Some expansion modules may be provided by the company that produced the printer and other expansion modules may be provided by companies other than the printer manufacturer. The expansion modules may be able to add a number of different features to the printer, for example a hard disk drive, a different type of input/output (I/O) port, a different internet connection protocol, additional USB ports, a USB hub, a security module and the like.

Printers typically include a formatter. The formatter is typically implemented as a printed circuit board (PCB). The formatter receives incoming print data and formats the data so that the data can be sent to a print engine. The print engine may be a LaserJet engine, an inkjet engine or the like. The formatter PCB is typically mounted in a card cage and the card cage is mounted in the printer. The card cage is typically used to hold the formatter PCB and used to reduce the electro-magnetic radiation (EMI) and radio frequency radiation (RFI) emitted by the formatter PCB. The card cage is also known as the formatter cage. In some examples the card cage with the formatter attached is designed to be removable from the printer by the user. This allows the user to install expansion modules onto the formatter. In other examples the card cage is accessible through a door in the printer.

Figure 1:
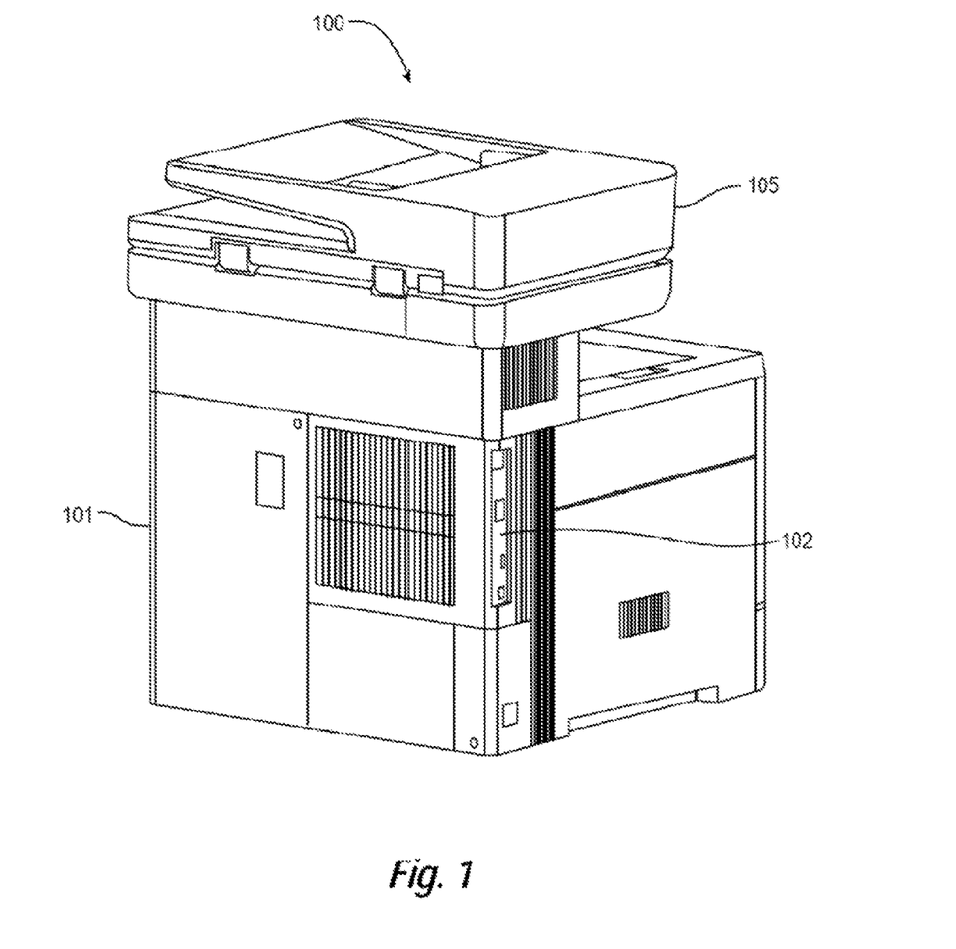
FIG. 1 is an example multi-functional peripheral (MFP) with a formatter cage installed in the printer.

FIG. 1 is an isometric back view of an example multi-functional peripheral (MFP) 100 with a formatter cage installed at the printer. MFP 100 comprises a printer 101 and a scanner 105. MFP 100 can use the printer and scanner as standalone devices for printing, scanning and faxing documents, or can use the printer and scanner in combination to copy documents. Formatter cage 102 is shown installed in printer 101. The MFP 100 is coupled to a network or other devices by connecting cables to the formatter card through openings in the formatter cage.

Figure 2:
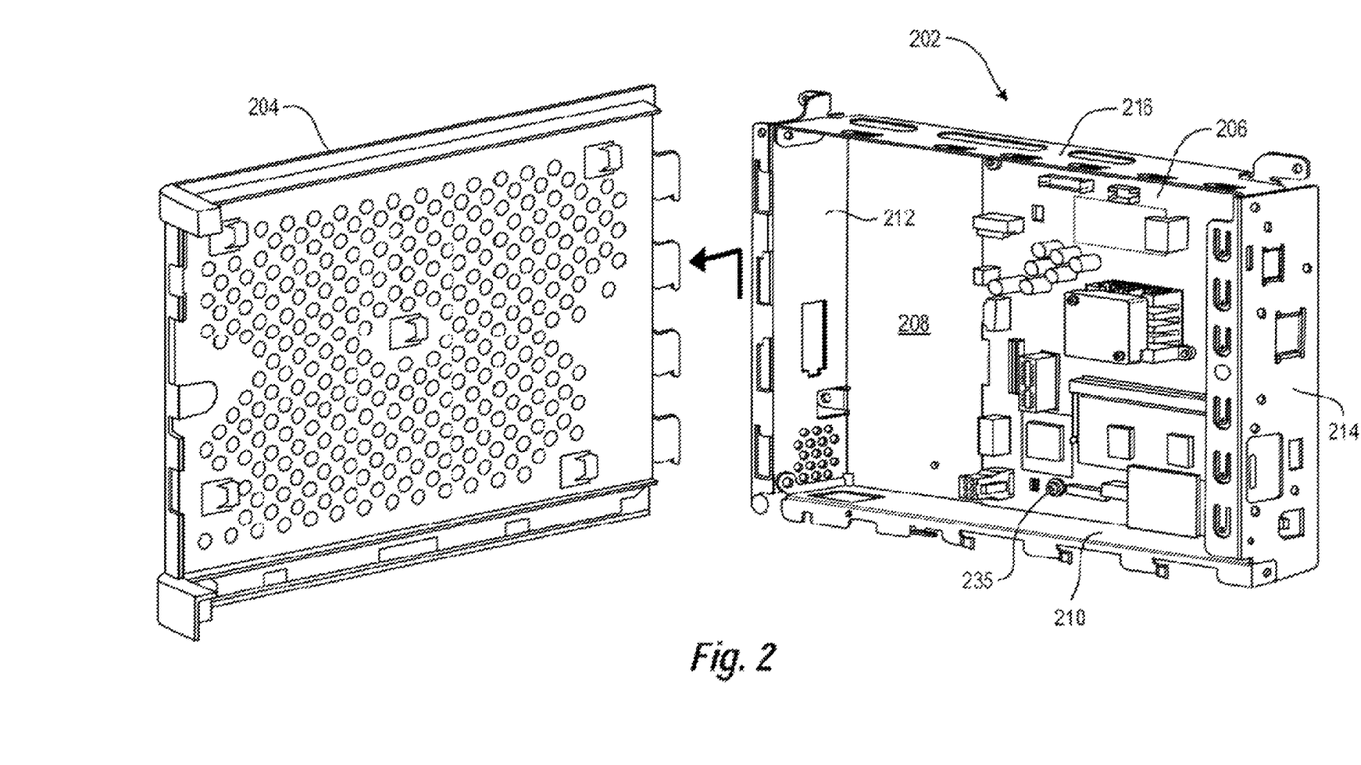
FIG. 2 is an isometric view of an example formatter cage 202.

FIG. 2 is an isometric view of an example formatter cage 202. Formatter cage 202 comprises a base 208, two sides (210 and 216), a back plate 212, a faceplate 214, a lid 204 and a formatter PCB 206. The cage is typically formed from a single piece of steel metal, but could also be a molded metal part. The two sides (210 and 216), the back plate 212, and the faceplate 214 are perpendicular to the base and form an enclosed volume. The base 208 has a top side facing the enclosed volume. The formatter PCB 206 is mounted to the top side of the base inside the enclosed volume with 4 screws 235 (see FIG. 3). The door 204 is removably attachable to the cage with a series of tabs along one end that fit into slots in the back plate 212. The door is shown detached from the cage in FIG. 2.

Figure 3:
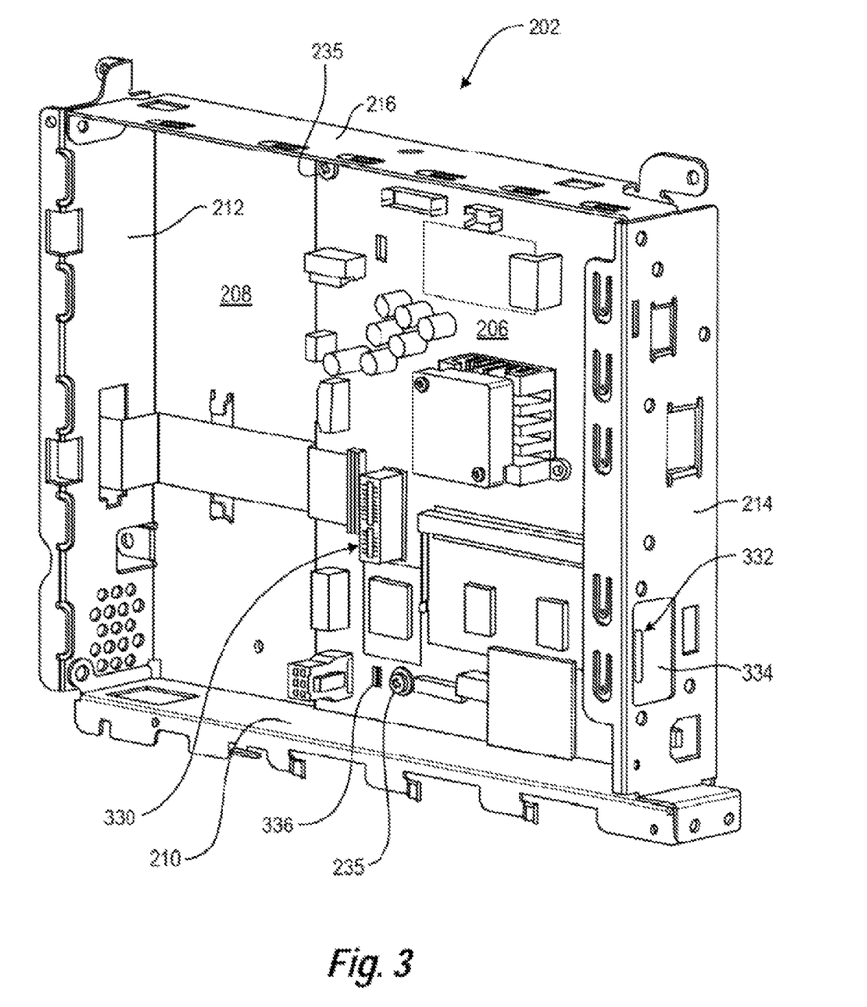
FIG. 3 is a close up of the example cage from FIG. 2.

FIG. 3 is a close up of the example cage from FIG. 2. FIG. 3 shows a connector 330 mounted to the top side of the formatter PCB 206. In one example the connector 330 is a Peripheral Component Interconnect Express (PCIe) 1X connector. Other types of connectors may also be used, for example USB connectors. The formatter PCB 206 also has a mounting hole near the edge of the formatter PCB 206 that is adjacent to the side 210 of cage 202. A slot 332 is formed in the faceplate 214. In one example, the slot 332 is formed inside a knockout area 334 in faceplate 214. The connector 330, the mounting hole 336 and the slot 332 form a three point mounting system for expansion modules. In some examples all three mounting points are used to secure the expansion module into the formatter cage. In some example, when the expansion module is below a weight threshold, only two mounting points may be used (the slot and the connector).

Figure 4:
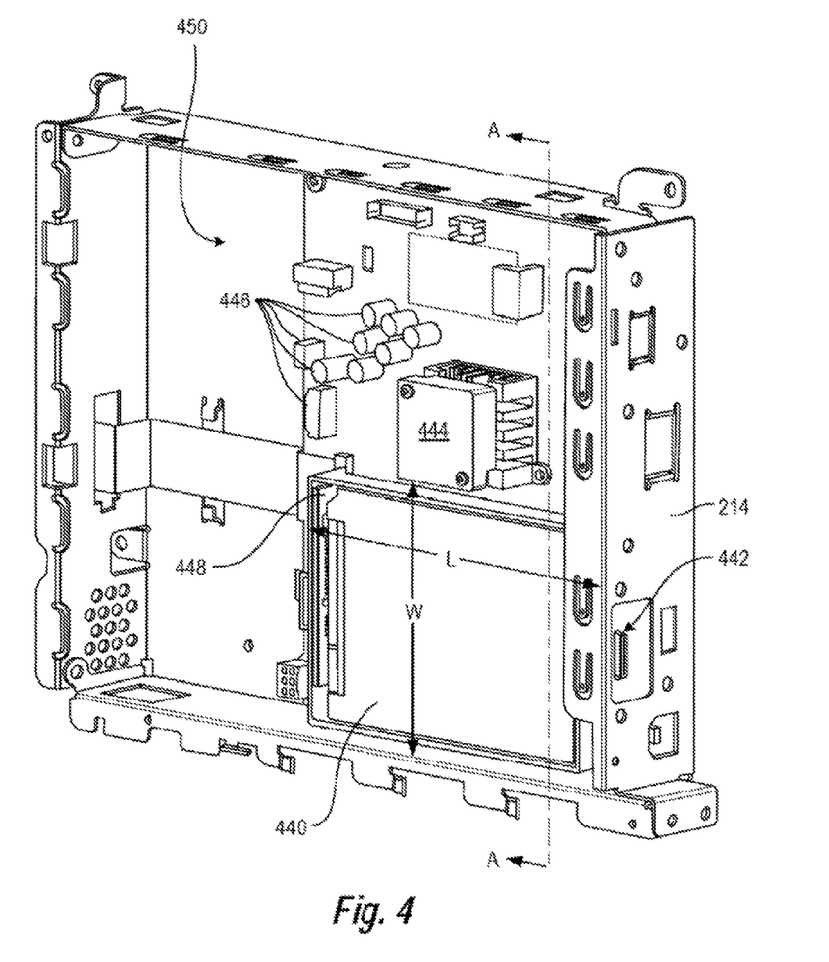
FIG. 4 is a close up of the example cage from FIG. 2 with an example expansion module 440 installed.

FIG. 4 is a close up of the example cage from FIG. 2 with an example expansion module 440 installed. Expansion module 440 has a tab 442 that fits in slot 334. Expansion module 440 also comprises a PC board 448. The PC board is perpendicular to the formatter PCB. A male connector tab on the PC board (see FIG. 6) fits into connector 330 and a locking clip on the expansion module, which clips to connector 330, holds expansion module 440 in place.

The volume available for expansion module 440 has been maximized. The length L of the available volume runs from the edge of connector 330 to the faceplate 214. The width W of the volume runs from one side 210 of cage 202 to the Application specific integrated circuit (ASIC) 444. In one example the length available to an expansion module is 118 mm and the width is 78 mm. The height or depth of the volume has been maximized. The height of all the components mounted under the area covered by the expansion module is below a threshold height. All the taller components have been moved out from under the area covered by the expansion module 440. For example the ASIC 444 and formatter power components 446 have been relocated away from the area coved by the expansion module 440. The area 450 to the left of the formatter PCB 206 is reserved for other components of the printer.

Figure 5:
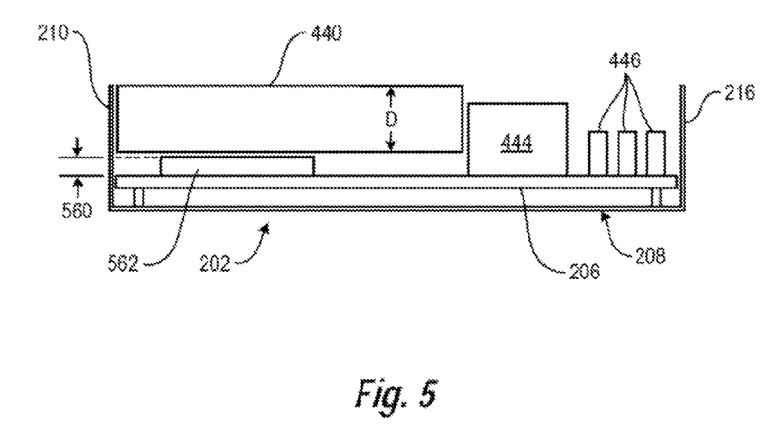
FIG. 5 is a sectional view AA of FIG. 4.

FIG. 5 is a sectional view AA of FIG. 4. FIG. 5 shows cage 202 comprising base 208 and two sides (210 and 216). Formatter PCB 206 is mounted in cage 202 on base 208. Expansion module 440 is shown mounted in cage 202. All the components (562) mounted under the expansion module 440 are below a height threshold 560. In one example the height threshold is 11.3 mm. The ASIC 444 and power components 446 are shown mounted on formatter PCB 206. The ASIC 444 and power supply components 446 are taller than the height threshold 560 and are mounted on areas of the formatter PCB that are not underneath the expansion module 440. For example the bulk capacitors in the power supply components are 14 mm high and the micro USB connector & plug is 28.5 mm high. Keeping the components mounted underneath the expansion module 440 below a height threshold maximizes the depth D that the expansion module can occupy. In one example the depth available to an expansion module is 19 mm.

The lid 204 is easily opened and closed which allows user access into cage 202 to install expansion modules. The lid 204 is also removable from the cage 202. In some examples expansion modules will include a built in lid replacement. This gives the expansion module some additional depth that can be used.

Figure 6:
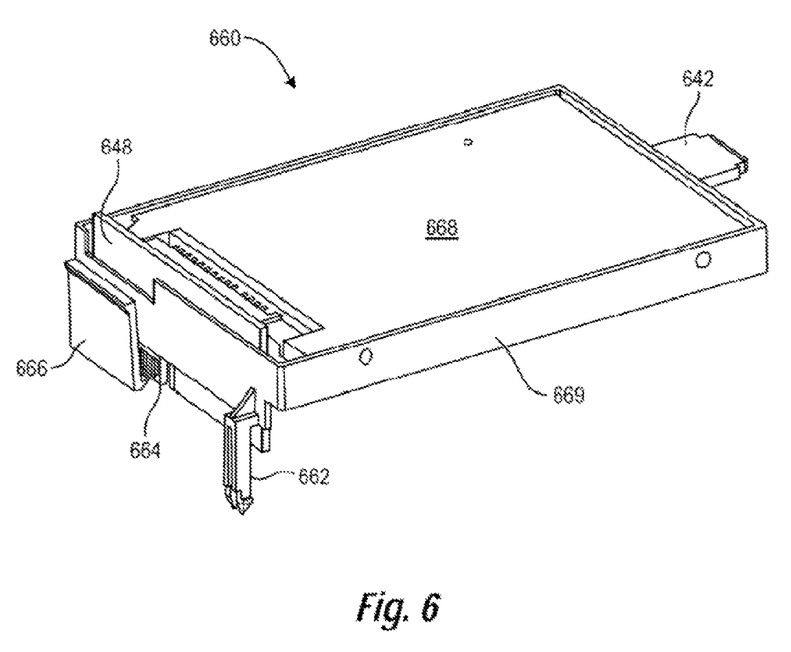
FIG. 6 is an isometric view of an example expansion module 660.

FIG. 6 is an isometric view of an example expansion module 660. Expansion module 660 allows a disk drive to be added to the printer. Expansion module 660 comprises a disk drive 668, a PC board 648, and a mounting frame 669. PC board 648 is mounted to disk drive 668 in a vertical orientation. PC board 648 has male connector tabs 664 formed along the bottom edge of the PC board 648. The male connector tabs 664 fit into, and couple with, the connector 330 mounted on the top side of formatter PCB 206.

Mounting frame 669 is attached to disk drive 668 and surrounds disk drive 668. Mounting frame 669 comprises a tab 642, a clip 666 and a mounting post 662. Tab 642 fits in slot 332 in faceplate 214. Clip 666 snaps over connector 330 and holds expansion module 660 in place. Mounting post 662 comprises two cantilevered tabs that snap into mounting hole 336 (see FIG. 3) in formatter PCB 206. Mounting post may use other attaching devices, for example a screw.

Figure 7:
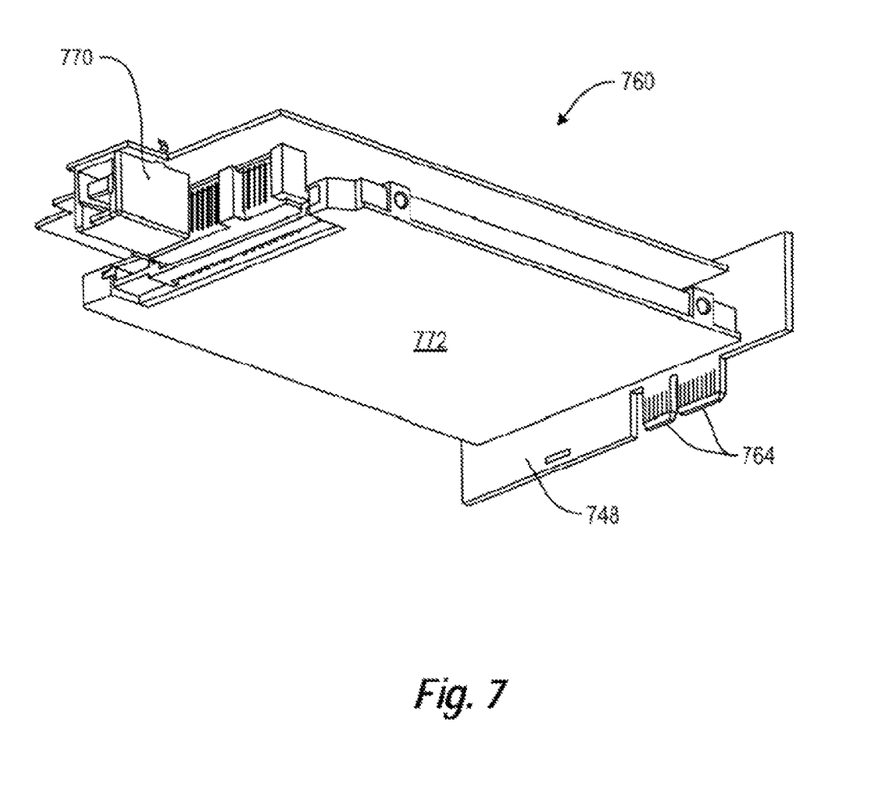
FIG. 7 is an isometric view of another example expansion module 760.

FIG. 7 is an isometric view of another example expansion module 760. Expansion module 760 allows an additional network port to be added to the printer. Expansion module 760 comprises a network interface card 772 and a PC board 748. PC board 748 is mounted to network interface card 772 in a vertical orientation. PC board 748 has male connector tabs 764 formed along the bottom edge of the PC board 748. The male connector tabs 764 fit into, and couple with, the connector 330 mounted on the top side of formatter PCB 206.

Network interface card 772 includes a network connector 770. Network connector is wider than slot 332 formed in faceplate 214. To install this expansion module the knockout portion 334 formed in faceplate 214 needs to be removed. Once the knockout portion 334 is removed, network connector 770 fits through the larger opening. Threaded holes are provided in the expansion module on either side of network connector. Holes on either side of the knockout portion allow screws to hold the end of expansion module 760 in place. Expansion module 760 is below a weight threshold and only uses two of the three mounting points in the three point mounting system in cage 202 (i.e. the connector 330 and the slot/knockout hole in faceplate 214).

In some examples, more than one expansion module may be installed in a printer. The first expansion module will be installed inside case 202 with a connector sticking through the knockout hole in faceplate 214. A second expansion module may attach to the connector of the first expansion module that is sticking through the knockout hole in faceplate 214.

In one example the connector 330 mounted on formatter PCB is a PCIe 1X connector. When the connector 330 is a PCIe 1x connector, the PC board (648 and 748) on the expansion module is a PCI Express card. The following table identifies the conductors on each side of the edge connector on a PCI Express card. The solder side of the printed circuit board (PCB) is the A side, and the component side is the B side. PRSNT1# and PRSNT2# pins must be slightly shorter than the rest, to ensure that a hot-plugged card is fully inserted.

| PCI express × 16 connector point | | |
| --- | --- | --- |
| Pin Side B | Side A | Comments |
| 1 +12 V | PRSNT1# | Must connect to furthest-apart PRSNT2# |
| 2 +12 V | +12 V | |
| 3 +12 V | +12 V | |
| 4 Ground | Ground | |
| 5 SMCLK | TCK | SMBus and JTAG port pins |
| 6 SMDAT | TDI | |
| 7 Ground | TDO | |
| 8 +3.3 V | TMS | |
| 9 TRST# | +3.3 V | |
| 10 +3.3 V anx | +3.3 V | Standby power |
| 11 WAKE# | PERST# | Link reactivation: power and REFCLK stabilized |
| | | Key notch |
| 12 Reserved | Ground | |
| 13 Ground | REFCLK+ | Reference clock differential pair |
| 14 HSOp(0) | REFCLK− | Lane 0 transmit data, + and − |
| 15 HSOn(0) | Ground | |
| 16 Ground | HSIp(0) | Lane 0 receive data, + and − |
| 17 PRSNT2# | HSIn(0) | |
| 18 Ground | Ground | |
| PCI × 1 board ends at pin 18 | | |

The definitions for all the signal lines in the PCIe 1X connector will conform to the PCIe standard. The PCIe standard for a 1X connector requires two power rails or outputs. One power rail supplies 3.3 volts and another power rail supplies 12 volts. In some examples the formatter PCB may not have a 12 volt source. In this case the definition for the power lines in the PCIe 1X connector will be modified. Instead of supplying 12 volts on one rail and 3.3 volts on the other rail, the PCIe 1X connector will supply a non-standard voltage, for example 5 volts, on one rail and 3.3 volts on the other rail.

The 3.3 volt power rail in the PCIe 1X connector will be enabled whenever the formatter PCB is powered up. In some examples the non-standard voltage power rail in the PCIe 1X connector will not be enabled unless the expansion module has an identification code (IC) that indicates that the expansion module is compatible/compliant with the non-standard voltage. One way to retrieve the IC from the expansion module is to use the standard PCIe signal lines in the PCIe connector to communicate with the installed expansion module. Another way is to use side band communication on the 3.3 volt power rail. Side band communication is also known as Inter-Integrated Circuit or I²C.

Using either method of communication, the IC of the installed expansion module can be retrieved and compared to a stored list if ICs that indicate that the installed expansion module is compatible/compliant with the non-standard voltage.

Once installed, expansion modules can communicate with the formatter PCB through connector 330. The installed expansion modules will use the standard protocol for the type of connector installed. For example when the connector is a PCIe 1X connector, the expansion module will use the PCIe protocol to communicate with the formatter. When the connector is a USB connector, the expansion module will use the USB protocol to communicate with the formatter.

What is claimed is:

1. A formatter cage, comprising:
   a base having two sides, a back plate and a faceplate, where the two sides, the faceplate and the back plate are perpendicular to the base to form an enclosed volume, where a top side of the base is in the enclosed volume;
   a formatter printed circuit board (PCB) mounted to the top side of base, the formatter PCB having a mounting hole adjacent to one of the two sides of base;
   a connector mounted on a top side of the formatter PCB; and
   a slot formed in the faceplate, where the slot, the connector and the mounting hole form a three point mounting system for an expansion module.

2. The formatter cage of claim 1, further comprising:
   a knockout section in the faceplate, where the slot is formed in the knockout section.

3. The formatter cage of claim 1, wherein the connector is a PCIe 1X connector.

4. The formatter cage of claim 3, wherein all signal lines in the PCIe 1X connector conform to a PCIe standard and the formatter PCB supplies a non-standard voltage on a power rail of the PCIe 1X connector.

5. The formatter cage of claim 4, wherein the non-standard voltage on the power rail is enabled only when an identification code from an installed expansion module indicated that the installed expansion module is compatible with the non-standard voltage.

6. The formatter cage of claim 1, wherein the formatter PCB has a first area, the first area includes the connector and the mounting hole and the first area is adjacent to the slot, the first area loaded with components that have a height no greater than a height threshold and components not mounted in the first area have a height greater than the height threshold.

7. The formatter cage of claim 6, wherein the height threshold is 11.4 mm or less.

8. The formatter cage of claim 1, further comprising:
   an expansion module installed in the three point mounting system.

9. The formatter cage of claim 8, wherein the expansion module uses only two of the three mounting points in the three point mounting system when the expansion module is below a weight threshold.

10. The formatter cage of claim 8, wherein the type of expansion module is selected from the following group of expansion module types: a hard disk drive expansion module, as input/output (I/O) port expansion module, an internet card expansion module, a USB port expansion module, a USB hub expansion module and a security expansion module.

11. The formatter cage of claim 1, wherein the volume available to an expansion module is at least 118 mm in length, 78 mm in width and 19 mm in depth.

12. The formatter cage of claim 1, wherein the formatter cage is installed in a printer.

13. A printer comprising:
   a housing;
   a formatter cage mounted inside the housing;
   the formatter cages comprising a base having two side, a back plate and a faceplate, where the two sides, the faceplate and the back plate are perpendicular to the base to form an enclosed volume, where a top side of the base is in the enclosed volume;
   a formatter printed circuit board (PCB) mounted to the top side of the base, the formatter PCB having a mounting hole adjacent to one of the two sides of the base;
   a connector mounted on a top side of the formatter PCB; and
   a slot formed in the faceplate, where the slot, the connector and the mounting hole form a three point mounting system for an expansion module.

14. The printer of claim 13, wherein the printer is a component in a multi-functional device.

15. A method of manufacturing a formatter cage, comprising:
   forming a base having two sides, a back plate and a faceplate, where the two sides, the faceplate and the back plate are perpendicular to the base to form an enclosed volume, where a top side of the base is in the enclosed volume;
   mounting a formatter printed circuit board (PCB) to the top side of the base, the formatter PCB having a mounting hole positioned adjacent to one of the two sides of the base;
   mounting a connector on a top side of the formatter PCB; and
   forming a slot in the faceplate, where the slot, the connector and the mounting hole form a three point mounting system for an expansion module.

\* \* \* \* \*

UNITED STATES PATENT AND TRADEMARK OFFICE
CERTIFICATE OF CORRECTION

PATENT NO. : 9,614,988 B2  
APPLICATION NO. : 14/787526  
DATED : April 4, 2017  
INVENTOR(S) : Jeff D. Ward Page 1 of 1

It is certified that error appears in the above-identified patent and that said Letters Patent is hereby corrected as shown below:

In the Claims

In Column 6, Line 9, in Claim 10, delete "as input/output" and insert -- an input/output --, therefor.

Signed and Sealed this  
Twelfth Day of September, 2017

Joseph Matal  
*Performing the Functions and Duties of the*  
*Under Secretary of Commerce for Intellectual Property and*  
*Director of the United States Patent and Trademark Office*